US012786888B2

(12) United States Patent
Yao et al.

(10) Patent No.: US 12,786,888 B2
(45) Date of Patent: Nov. 3, 2026

(54) TECHNIQUES FOR BEAM CONFIGURATION IN WIRELESS COMMUNICATIONS

(71) Applicant: ZTE Corporation, Shenzhen (CN)

(72) Inventors: Ke Yao, Shenzhen (CN); Bo Gao, Shenzhen (CN); Shujuan Zhang, Shenzhen (CN); Shijia Shao, Shenzhen (CN); Zhaohua Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 230 days.

(21) Appl. No.: 18/530,963

(22) Filed: Dec. 6, 2023

(65) Prior Publication Data

US 2024/0259952 A1 Aug. 1, 2024

Related U.S. Application Data

(63) Continuation of application No. PCT/CN2022/088867, filed on Apr. 24, 2022.

(51) Int. Cl.

*H04W 52/14* (2009.01)
*H04W 52/24* (2009.01)
*H04W 74/0833* (2024.01)

(52) U.S. Cl.

CPC ....... *H04W 52/146* (2013.01); *H04W 52/242* (2013.01); *H04W 74/0833* (2013.01)

(58) Field of Classification Search

CPC ... H04W 52/14; H04W 52/24; H04W 52/146; H04W 74/0833

See application file for complete search history.

(56) References Cited

U.S. PATENT DOCUMENTS

2019/0261281 A1 8/2019 Jung et al.
2022/0022141 A1 1/2022 Cirik et al.
2023/0028861 A1 1/2023 Yao et al.

FOREIGN PATENT DOCUMENTS

WO 2021/127606 A1 6/2021
WO 2021/147933 A1 7/2021

OTHER PUBLICATIONS

Extended European Search Report for Co-pending EP Application No. 22 938 842.6, dated Dec. 3, 2024, 10 pages.
OPPO, "Implementation of MIMO RRC parameters," R2-2200260, 3GPP TSG-RAN WG2 #116bis, E-meeting, Jan. 2022, 9 pages.
"3rd Generation Partnership Project; Technical Specification Group Radio Access Network; NR; Physical layer procedures for control (Release 17)," 3GPP TS 38.213 V17.0.0 (Dec. 2021), 225 pages.

(Continued)

*Primary Examiner* — Tuan H Nguyen
(74) *Attorney, Agent, or Firm* — Ashurst Perkins Coie US LLP

(57) ABSTRACT

Wireless communications techniques are disclosed. One example method includes receiving, by a wireless device, beam state information including a set of beam states, determining, a power control parameter for an uplink transmission, and applying the power control parameter to the uplink transmission. Another example method includes determining, by a wireless device based on a signal associated with a resource information, a transmission parameter, and performing a communication associated with the resource information, where the performed communication applies the transmission parameter.

20 Claims, 8 Drawing Sheets

(56) References Cited

OTHER PUBLICATIONS

"3rd Generation Partnership Project; Technical Specification Group Radio Access Network; NR; NR and NG-RAN Overall Description; Stage 2 (Release 17)," 3GPP TS 38.300 V17.0.0 (Mar. 2022), 204 pages.
"3rd Generation Partnership Project; Technical Specification Group Radio Access Network; NR; Radio Resource Control (RRC) protocol specification (Release 17)," 3GPP TS 38.331 V17.0.0 (Mar. 2022), 1221 pages.
International Search Report and Written Opinion for International Application No. PCT/CN2022/088867, mailed on Dec. 15, 2022 (9 pages).
Vivo, "Discussion on Enhancements on Multi-Beam Operation," 3GPP TSG RAN WG1 #95, Spokane, USA, R1-1812324, Nov. 12-16, 2018, 10 pages.
EPO Communication pursuant to Article 94(3) EPC for EP Application No. 22 938 842.6, dated Feb. 2, 2026, 5 pages.

TECHNIQUES FOR BEAM CONFIGURATION IN WIRELESS COMMUNICATIONS

CROSS-REFERENCE TO RELATED APPLICATION

This application is a continuation and claims priority to International Application No. PCT/CN2022/088867, filed on Apr. 24, 2022, the disclosure of which is hereby incorporated by reference herein in its entirety.

TECHNICAL FIELD

This patent document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support an increasingly mobile society.

SUMMARY

This patent document relates to techniques for a beam configuration in wireless communication networks.

In one exemplary aspect, a wireless communication method is disclosed. The method includes receiving, by a wireless device, beam state information including a set of beam states; determining, by the wireless device, a power control parameter for an uplink transmission; and applying, by the wireless device, the power control parameter to the uplink transmission.

In another exemplary aspect, a wireless communication method is disclosed. The method includes determining, by a wireless device based on a signal associated with a resource information, a transmission parameter; and performing, by the wireless device, a communication associated with the resource information, the communication applying the transmission parameter.

In another exemplary aspect, a wireless communication method is disclosed. The method includes transmitting, by a network device to a wireless device, beam state information including a set of beam states, wherein the beam state information is configured to cause the wireless device perform operations including: determining a power control parameter for an uplink transmission; and applying the power control parameter to the uplink transmission.

In another exemplary aspect, a wireless communication method is disclosed. The method includes performing, by a network device, a first communication including a signal associated with a resource information, wherein the first communication is configured to cause a wireless device to perform operations including: determining, based on the first signal, a transmission parameter; and applying the transmission parameter to a second communication associated with the resource information.

In yet another exemplary aspect, a wireless communication apparatus comprising a processor configured to implement an above-described method is disclosed.

In yet another exemplary aspect, a computer storage medium having code for implementing an above-described method stored thereon is disclosed.

The above and other aspects and their implementations are described in greater detail in the drawings, the descriptions, and the claims.

DETAILED DESCRIPTION

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

Figure 1:
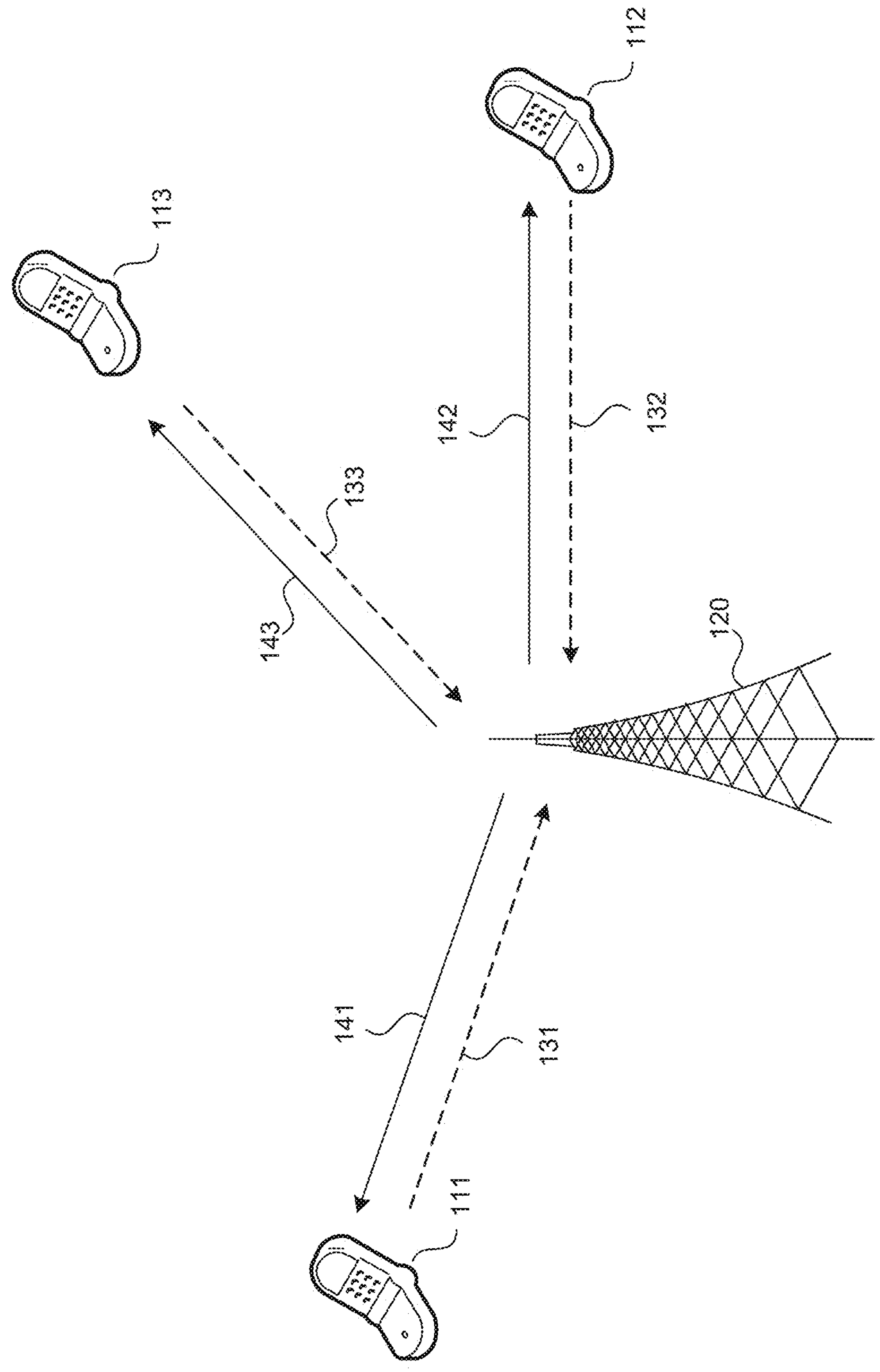
FIG. 1 shows an example of a wireless communication system based on some example embodiments of the disclosed technology.

FIG. 1 shows an example of a wireless communication system (e.g., a long term evolution (LTE), 5G or NR cellular network) that includes a BS 120 and one or more user equipment (UE) 111, 112 and 113. In some embodiments, the uplink (UL) transmissions (131, 132, 133) can include uplink control information (UCI), higher layer signaling (e.g., UE assistance information or UE capability), or uplink information. In some embodiments, the downlink (DL) transmissions (141, 142, 143) can include DCI or high layer signaling or downlink information. The UE may be, for example, a smartphone, a tablet, a mobile computer, a machine to machine (M2M) device, a terminal, a mobile device, an Internet of Things (IoT) device, and so on.

Key features of Fifth Generation (5G) New Radio (NR) mobile communication systems relate to the support of high frequency bands. High frequency bands have abundant frequency domain resources, but wireless signals in high frequency bands decay quickly, causing coverage of these wireless signals to become small. However, transmitting signals in a beam mode enables energy to be concentrated in a relatively small spatial range, thereby improving the coverage of the wireless signals in high frequency bands.

In order to reduce application time for a new beam as well as overhead of beam indication, a unified beam mechanism is proposed. In a unified beam mechanism, an indication of a new beam can be applied to multiple transmissions and/or receptions.

A Unified TCI framework was introduced in Rel-17 to unify uplink (UL) and downlink (DL) transmission configuration indicator (TCI) state indication modes. However, in the current framework, there is no scheme to determine power control parameters of an UL transmission before application of an indicated TCI state. In addition, there is no scheme to determine default beam or PC parameters for DL or UL transmissions before application of an indicated TCI state, for instance, during beam failure recovery (BFR) in multi-TRP (multiple transmission and reception points) scenarios.

For example, a network, e.g., through gNodeB (gNB) in 5G NR, can indicate a TCI state to a UE, called an indicated TCI state. The indicated TCI state can be a joint state which is applied for both downlink and uplink, or separate indicated TCI states can be used, with a first TCI state for DL, and a second TCI state for UL. The TCI states can be configured by higher layer signaling, such as Radio Resource Control (RRC) signaling. After receiving a set of configured TCI states, a TCI state can be activated based on a Medium Access Contol—Control Element (MAC CE), which activates a codepoint of a TCI state(s). When the MAC CE is applied, e.g., a period after a Hybrid Automatic Repeat Request Acknowledgment (HARQ-ACK) corresponding to reception of the MAC CE, the TCI state(s) in the codepoint activated by the MAC CE are determined as indicated TCI state(s), which are then applied. In some cases, a MAC CE activates more than one codepoint. A downlink control information (DCI) message then indicates a codepoint of the multiple TCI codepoints activated by the MAC CE. The TCI states in the one codepoint indicated by the DCI message are determined as indicated TCI states and are applicable after a period after acknowledgement of reception of the DCI, or after an acknowledgement of reception of a Physical Downlink Shared Channel (PDSCH) transmission scheduled by the DCI message. The indicated TCI state can be determined according to a codepoint of TCI states which may comprise one or more TCI states, e.g., by the direction of downlink or uplink, or by a TRP the TCI state is associated with.

If a UE is provided a list of TCI states, e.g., DLorJoint-TCIState or UL-TCIstate, and an indicated TCI state, e.g., DLorJoint-TCIState or UL-TCIstate, power control parameters of a UL transmission can be determined according to the indicate TCI state. However, there is no scheme to determine power control parameters of an UL transmission before application of an indicated TCI state if UE is provided a list of TCI states, e.g., via RRC signaling from the network.

Therefore, in some embodiments, techniques are disclosed that enable PC parameters for a UL transmission to be determined during a time period after a UE receives a list of beam states but before a beam state is applied.

In some embodiments of the disclosed technology, a "beam state" indicates a beam, a quasi-co-location (QCL) state, a transmission configuration indicator (TCI) state, a spatial relation state (also referred to as spatial relation information state), a reference signal (RS), a spatial filter, or pre-coding information. The RS can be a synchronization signal block (SSB), channel state information reference signal (CSI-RS), or sounding reference signal (SRS). A beam state can be a TCI state, or a RS resource indication.

For example, the PC parameters used for a UL transmission can be determined based on PC parameters used for a Physical Random Access Channel (PRACH) transmission; Message 3 (Msg3); a Physical Uplink Shared Channel Transmission (PUSCH) after a PRACH transmission; Message A (MsgA); a SSB used to obtain a Master Information Block (MIB), a PC parameter (e.g. with a predefined or a configured index) in a pool of PC parameters configured by RRC signaling, or another predefined or preconfigured value.

In some embodiments, the determined PC parameters include at least one of: a pathloss reference signal (PL-RS), which is a DL RS (e.g., SSB or CSI-RS) used for PL measurement; an open loop power control parameter, e.g., target reception power (P0) or pathloss compensation factor (a, or alpha); or a closed loop power control parameter, e.g., a closed loop power control index, indicator, or a number of closed loop power controls.

In some embodiments, the UL transmission that uses the determined PC parameters includes at least one of: a PUSCH transmission, a Physical Uplink Control Channel (PUCCH) transmission, or a SRS.

Embodiment 1

A UE that is provided more than one TCI state can be configured to determine power control parameters before an indicated TCI state is applied. For example, the TCI states can be configured by RRC signaling received at the UE. The UE can then receive a MAC CE signaling that indicates one or more of the TCI states to be activated or deactivated. A DCI may indicate one or more TCI states corresponding to a codepoint of TCI states from the MAC CE. In this example, the UE can determine PC parameters after receiving the RRC signaling, but prior to the indicated TCI state (e.g., by DCI or MAC CE) being applicable.

Furthermore, power control parameters can be determined if one of the following conditions is satisfied:

Condition 1: A UE is provided more than one TCI state, e.g., configured by RRC signaling. The TCI states are provided after an initial random access procedure. For example, this condition is satisfied after a UE receives an initial higher layer configuration including more than one DLorJoint-TCIState or UL-TCIState and before application of an indicated TCI state of the configured TCI states Condition 2: A UE is provided more than one TCI state (e.g., reconfigured by RRC signaling) after a random access procedure initiated by a reconfiguration with sync procedure. For example, this condition is satisfied after a UE receives a higher layer configuration of more than one DLorJoint-TCIState or UL-TCIState as part of a reconfiguration with sync procedure and before applying an indicated TCI state of the configured TCI states.

If a UE is provided (e.g., configured or reconfigured by RRC signaling) more than one TCI state and before application of an indicated TCI state according to one of the above mentioned conditions, then the UE can determine at least one of the following power control parameters: a pathloss reference signal (PL-RS), a received target power (P0), a pathloss compensation factor (a, or "alpha"), or a closed loop power control parameter. The power control parameter can then be applied to at least one of the following UL transmissions: a PUSCH transmission, a PUCCH transmission, or a SRS.

In some embodiments, a PL-RS is determined according to the above conditions. The PL-RS can be applied to an uplink transmission, such as a PUSCH transmission. In some embodiements, the PL-RS is applied to a PUCCH transmission or a SRS. The PL-RS can be configured as a default value.

In some embodiments, the power control parameter can be a PL-RS. The PL-RS can be determined according to at least one of:

A Synchronization Signal/Physical Broadcast Channel (SS/PBCH) block (also referred to as an SSB). In some embodiments, a UE uses a SS/PBCH block to obtain a Master Information Block (MIB). A UE then calculates a pathloss value using a RS resource from a SS/PBCH block with the same SS/PBCH block index as the SSB the UE used to obtain the MIB.

A corresponding PRACH transmission. For example, the PL-RS can be determined based on a SS/PBCH block associated with a PRACH transmission, such as by calculating a pathloss value using a RS resource from the SS/PBCH block.

A SS/PBCH block the UE identifies during an initial random access procedure, e.g., corresponding to Condition 1 above, or an SS/PBCH block or a CSI-RS resource the UE identifies during a random access procedure initiated by a reconfiguration with sync procedure, e.g., corresponding to Condition 2. In some embodiments, the PL-RS can be determined based on an SS/PBCH block or CSI-RS resource the UE identifies during a later random access procedure after the initial random access procedure or the random access procedure initiated by the reconfiguration with sync procedure. For example, the PL-RS can be determined using an SS/PBCH block or CSI-RS resource associated with the latest random access procedure.

A Msg3, MsgA, a PUSCH transmission following a PRACH transmission, or a PUSCH transmission scheduled by a random access response (RAR) UL grant. For example, the UE may first transmit or receive one or more of the listed communications. The PL-RS can then be determined by using the same PL-RS associated with the Msg3, MsgA, the PUSCH transmission following the PRACH transmission, or a the PUSCH transmission scheduled by a RAR UL grant. The RAR UL grant may occur during the initial access procedure, during random access procedure initiated by the reconfiguration with sync procedure, or during a later random access procedure.

A lowest ID in a PL-RS parameter pool configured for uplink transmissions. For example, each PL-RS in the pool can be associated with an ID, and the UE can select the PL-RS with the lowest ID to apply to a transmission or reception.

A PL-RS associated with a TCI state with a lowest ID in a joint or UL TCI state pool. For example, each TCI state in either a joint TCI state pool or a UL TCI state pool can be associated with an ID. The TCI state with the lowest ID among the pool can be associated with a PL-RS, and the PL-RS is then applied to a transmission or reception by the UE.

A lowest ID among one or more CORESETs, or a lowest CORESET Pool ID. For example, a CORESET can be selected with a lowest CORESET ID. The PL-RS can then be determined using a RS resource from a SS/PBCH block or using a CSI-RS resource associated with the selected CORESET.

In some embodiments, the power control parameter can be a received target power (P0), or a power control factor ($\alpha$, or "alpha"). In some embodiments, P0 or alpha are power control parameters applied to a PUSCH transmission. P0 or alpha can be UE-specific parameters or cell-specific parameters. In some embodiments, P0 or alpha can be configured as a default value.

For a configured grant (CG) or a dynamic grant (DG) PUSCH transmission, P0_nominal is a cell-specific p0. P0_nominal can be a preconfigured value or can be set based on a corresponding P0 of a Msg3 or a MsgA.

For a CG or DG PUSCH transmission, a UE-specific P0 or alpha, e.g., P0_UE-specific, can be determined according to at least one of:

A lowest ID in P0 pool or alpha pool configured for an uplink transmission. For instance, the P0 pool or the alpha pool can be configured for PUSCH transmissions.

A P0 or alpha associated with a TCI state with a lowest ID among a joint or UL TCI state pool. The TCI state can be applied to PUSCH transmissions.

Msg3, MsgA, a PUSCH transmission after a PRACH transmission, or a PUSCH transmission scheduled by a RAR UL grant. For example, the same P0 or alpha for the Msg3, MsgA, the PUSCH transmission after the PRACH transmission, or the PUSCH transmission scheduled by the RAR UL grant can be used to configure P0 or alpha for a subsequent PUSCH transmission. The RAR UL grant can occur during an initial access procedure, during a random access procedure initiated by the reconfiguration with sync procedure, or during another random access procedure.

In some embodiments, a P0 value can be determined and applied for a PUCCH transmission. This P0 for PUCCH can be a UE-specific parameter or cell-specific parameter. P0 for PUCCH can be configured as a default parameter.

A cell-specific P0 for PUCCH transmissions, P0_nominal can be a preconfigured value or can be set based on a corresponding P0 of a Msg3 or a MsgA.

A UE-specific P0 for PUCCH transmissions can be determined according to at least one of:

A lowest ID in P0 pool or alpha pool configured for an uplink transmission. For instance, the P0 pool or the alpha pool can be configured for PUCCH transmissions.

A P0 or alpha associated with a TCI state with a lowest ID among a joint or UL TCI state pool. The TCI state can be applied to PUCCH transmissions.

Msg3, MsgA, a PUSCH transmission after a PRACH transmission, or a PUSCH transmission scheduled by a RAR UL grant. For example, the same P0 or alpha for the Msg3, MsgA, the PUSCH transmission after the PRACH transmission, or the PUSCH transmission scheduled by the RAR UL grant can be used to configure P0 or alpha for a subsequent PUSCH transmission. The RAR UL grant can occur during an initial access procedure, during a random access procedure initiated by the reconfiguration with sync procedure, or during another random access procedure.

The UE-specific P0 can be set to 0.

In some embodiments, a P0 or an alpha can be determined and applied for a SRS. In some embodiments, the P0 or alpha can be configured as a default value. The P0 or alpha configured for a SRS can be determined according to at least one of:

P0 or alpha configured for a SRS resource set. For example, PC parameters can be configured for a SRS resource set by RRC signaling, and PC parameters configured for the SRS can be determined based on the PC parameters configured for the SRS resource set; or P0 or alpha can be determined in the same manner as that for PUSCH transmissions, as described above.

In some embodiments, the power control parameter is a closed loop power control (CL-PC) parameter. The CL-PC parameter can be applied to a PUSCH transmission or a PUCCH transmission. In some embodiments, the CL-PC parameter can be configured as a default value. For example, the CL-PC parameter can be denoted as 1, where 1=0 by default.

Embodiment 2

Condition 3: A UE can provided a single TCI state, such as a DLorJoint-TCIState or a UL-TCIstate, e.g., by higher layer signaling. When a UE receives a higher layer configuration consisting of a single DLorJoint-TCIState or UL-TCIState, that state can be used as an indicated TCI state.

Similar to embodiment 1, upon satisfying Condition 3, the UE can determine at least one of the following power control parameters: a pathloss reference signal (PL-RS), a received target power (P0), or a power control factor (a, or "alpha"), or a closed-loop power control parameter. The power control parameter can then be applied to at least one of the following UL transmissions: a PUSCH transmission, a PUCCH transmission, or a SRS.

In some embodiments, the power control parameter is a PL-RS. The PL-RS can be applied for a PUSCH transmission, a PUCCH transmission, or a SRS. In some embodiments, the PL-RS can be configured as a default value. The PL-RS can be determined according to at least one of:

The PL-RS is configured according to the single configured TCI state; or

The PL-RS can be configured according to any of the methods described above for Conditions 1 and 2.

In some embodiments, the power control parameter is a P0 or an alpha. P0 can be applied to a PUSCH transmission, a PUCCH transmission, or a SRS. In some embodiments, the P0 or alpha can be configured as a default value. Alpha can be applied to a PUSCH transmission or a SRS. P0 or alpha can be determined according to at least one of:

P0 or alpha can be configured according to the single configured TCI state; or

P0 or alpha can be configured according to any of the methods described above for Conditions 1 and 2.

In some embodiments, the power control parameter is a CL-PC. The CL-PC parameter can be applied to a PUSCH transmission, a PUCCH transmission, or a SRS. The CL-PC parameter can be configured according to the single configured TCI state. In some embodiments, the CL-PC parameter can be configured as a default value. For example, the CL-PC parameter can be denoted as 1, where 1=0 by default.

Embodiment 3

In some implementations, a UE may need to perform a communication, but PC parameters or a pool of PC parameters are not available. For instance, the PC parameters are not configured or provided by signaling. Thus, default PC parameters may be needed.

For example, when applying an indicated TCI state for a PUSCH transmission, a PUCCH transmission, or SRS, when no PL-RS pool is configured, then a PL-RS cannot be determined for an indicated TCI state.

A default PL-RS can be determined according to at least one of the following:

Option 1: The PL-RS is determined by a PL-RS associated with a Msg3 or a MsgA during a random access channel (RACH) procedure, a PUSCH transmission that occurs after a PRACH transmission, or a PUSCH transmission scheduled by a RAR UL grant during a random access procedure.

Option 2: A periodic DL-RS associated with the indicated TCI state, if applicable, can be used as the default PL-RS.

Option 2 is flexible, but there may be a risk that no periodic DL-RS exists. Therefore, a mixed option may be preferred, where option 2 is used if a periodic DL-RS associated with the indicated TCI state is applicable or present, and option 1 is used otherwise.

For a CG or a DG PUSCH transmission and PUCCH transmission, a cell-specific P0 can be a configured value, if present. The cell-specific P0 can also be a value used for Msg3/MsgA, a PUSCH transmission that occurs after a PRACH transmission, or a PUSCH transmission scheduled by a RAR UL grant during a random access procedure.

A default UE-specific P0, P0_UE-specific can be configured for a PUSCH transmission or a PUCCH transmission. A default alpha can be configured for a PUSCH transmission. The default P0 or alpha can be determined as:

1. P0 or alpha can be a value set for a Msg3 or MsgA in a RACH procedure, a PUSCH transmission that occurs after a PRACH transmission, or a PUSCH transmission scheduled by a RAR UL grant during a random access procedure.

$$2.\ P0\_UE\text{-}specific = 0.$$

In some embodiments, P0 or alpha can be configured for a SRS applying the indicated TCI state. P0 or alpha for the SRS can be determined in the same manner as for a PUSCH transmission.

In some embodiments, a CL-PC parameter can be configured for a CG or DG PUSCH transmission, a PUCCH transmission, or a SRS applying the indicated TCI state. The CL-PC parameter can be 1, where:

$$l = 0.$$

In summary, a power control scheme can be determined for an UL transmission, when no corresponding power control parameter pool is configured, by:

When the UL transmission includes a PL-RS for PUSCH or PUCCH transmissions, or for a SRS applying the indicated TCI state, PC parameters can be determined by: a periodic DL-RS in the indicated TCI state or associated with the indicated TCI state, if available; and otherwise by a PL-RS for a Msg3 or MsgA, a PUSCH transmission that occurs after a PRACH transmission, or a PUSCH transmission scheduled by a RAR UL grant during a random access procedure (e.g., if the periodic DL-RS in the indicated TCI state or associated with the indicated TCI state is not available).

For a CG or DG PUSCH or PUCCH transmission, a cell-specific P0 can be a configured value, if present, or a value for Msg3 or MsgA. A UE-specific P0 or an alpha for a PUSCH transmisssion, or a P0_UE-specific for a PUCCH transmission can be determined based on a value for: Msg3, MsgA, a PUSCH transmission that occurs after a PRACH transmission, or a PUSCH transmission scheduled by a RAR UL grant during a random access procedure. P0 and alpha for a SRS applying the indicated TCI state can be determined in the same manner as for a PUSCH transmission.

For a CG or DG PUSCH or PUCCH transmission, and for a SRS applying the indicated TCI state, a closed-loop power control parameter can be determined by 1=0

Figure 2:
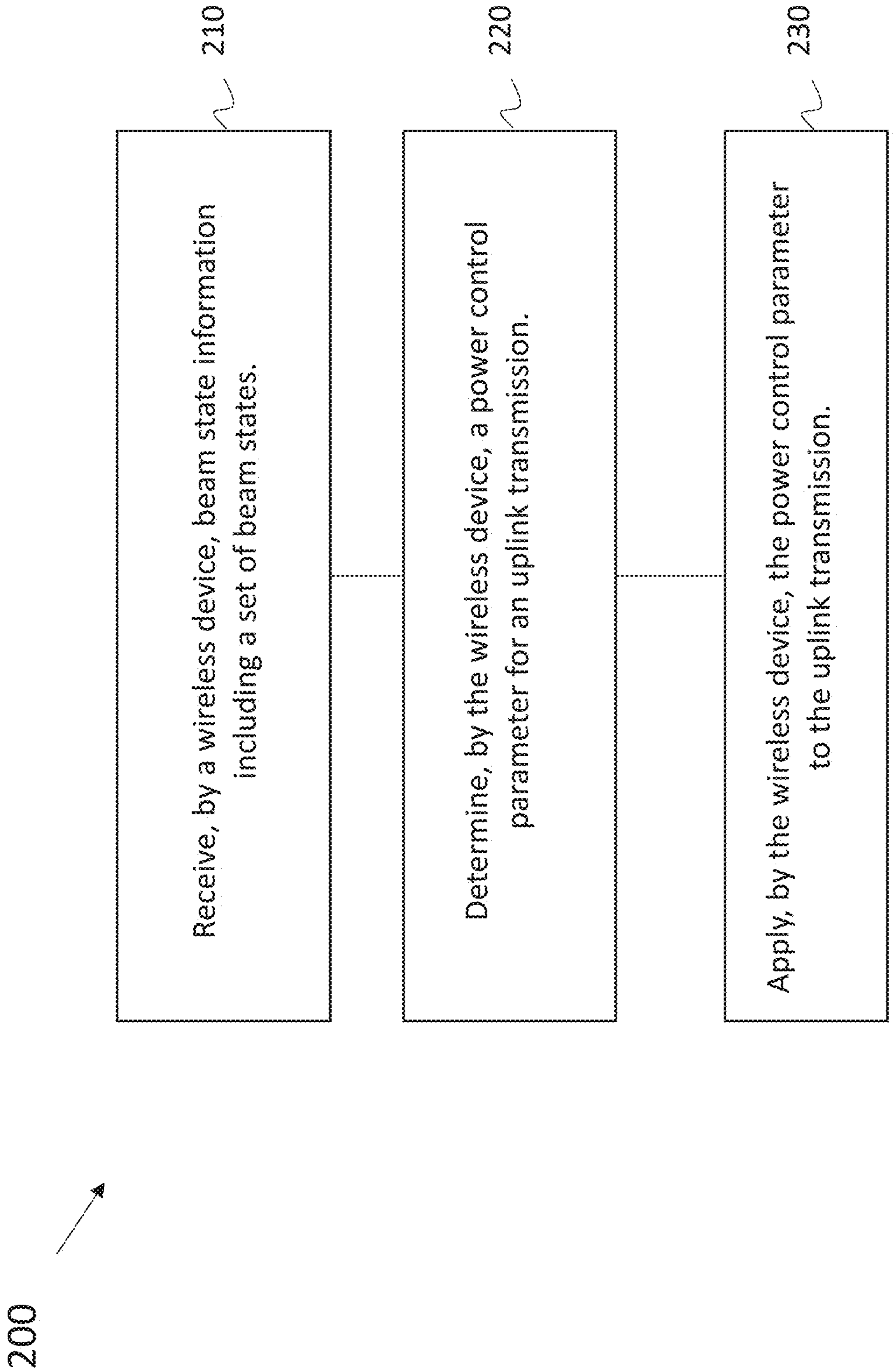
FIG. 2 is a flow diagram of a process for wireless communication in accordance with embodiments of the present disclosure.

FIG. 2 is a flow diagram of a process 200 for wireless communication in accordance with embodiments of the present disclosure. For example, the process 200 can be performed by a wireless device in accordance with the techniques described above.

At 210, beam state information including a set of beam states is received by a wireless device. For example, the beam state can include at least one of: a reference signal (RS) resource, a RS resource set, or a transmission configuration indicator (TCI) state.

At 220, a power control parameter for an uplink transmission is determined. For example, the power control parameter can comprise at least one of: a pathloss reference signal (PL-RS), an open loop power control parameter, or a closed loop power control parameter. In some embodiments, the power control parameter is a target received power (P0) or a pathloss factor (alpha).

In some embodiments, the power control parameter is determined prior to application of an indicated beam state of the set of beam states or in response to a determination that no power control parameter pool is neither configured or provided.

In some embodiments, the beam state information is received after a random access procedure. For example, the random access procedure can be an initial random access procedure or initiated by a reconfiguration with sync procedure.

In some embodiments, the set of beam states includes only one beam state, and the power control parameter is determined based on the one beam state.

Figure 3:
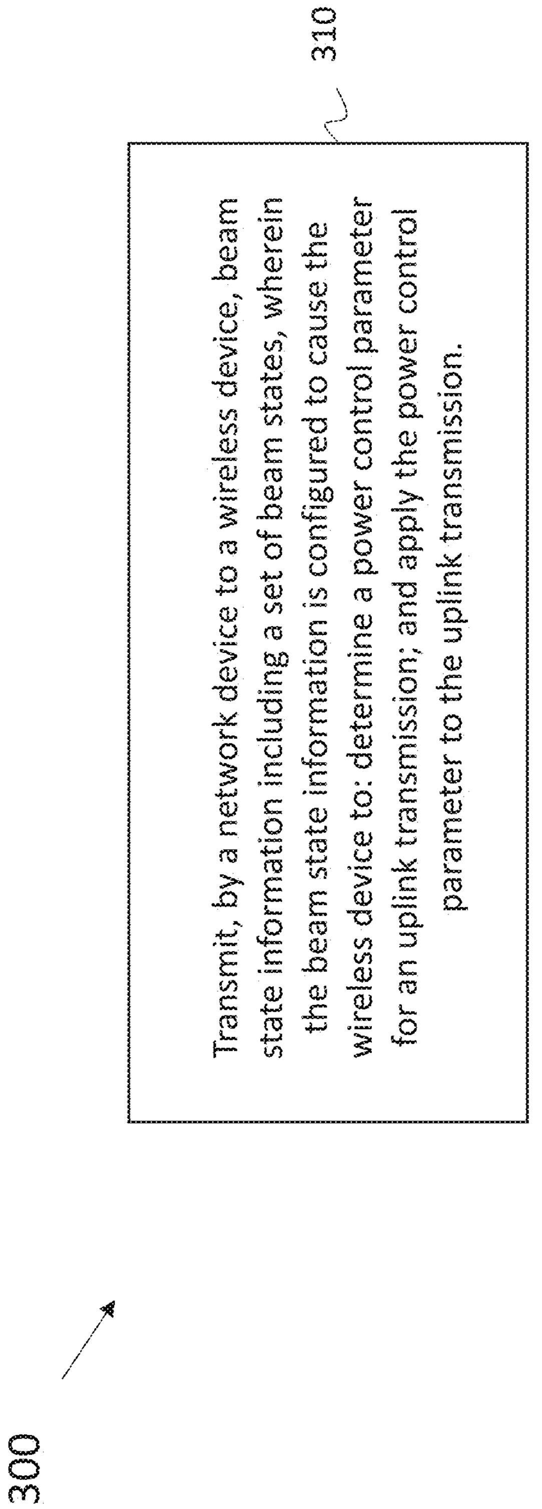
FIG. 3 is a flow diagram of a process for wireless communication in accordance with embodiments of the present disclosure.

FIG. 3 is a flow diagram of a process 300 for wireless communication in accordance with embodiments of the present disclosure. For example, the process 300 can be performed by a network device in accordance with the techniques described above.

At 310, beam state information including a set of beam states is transmitted from a network device to a wireless device, where the beam state information is configured to cause the wireless device to: determine a power control parameter for an uplink transmission and apply the power control parameter to the uplink transmission. In some embodiments, the network device can then receive the uplink transmission from the wireless device.

For example, the beam state can include at least one of: a reference signal (RS) resource, a RS resource set, or a transmission configuration indicator (TCI) state. The power control parameter can comprise at least one of: a pathloss reference signal (PL-RS), an open loop power control parameter, or a closed loop power control parameter. In some embodiments, the power control parameter is a target received power (P0) or a pathloss factor (alpha).

In some embodiments, the power control parameter is determined prior to application of an indicated beam state of the set of beam states or in response to a determination that no power control parameter pool is neither configured or provided.

In some embodiments, the beam state information is transmitted after a random access procedure. For example, the random access procedure can be an initial random access procedure or initiated by a reconfiguration with sync procedure.

In some embodiments, the set of beam states includes only one beam state, and the power control parameter is determined based on the one beam state.

Embodiment 4

A multi-TRP approach uses multiple transmission and reception points (TRPs) to improve transmission throughput in long term evolution (LTE), long term evolution-advanced (LTE-A) and new radio access technologies (NR) in enhanced mobile broadband (eMBB) scenarios. In addition, the use of multi-TRP transmission or reception can reduce information blockage and improve the transmission reliability in ultra-reliability and low latency communication (URLLC) scenarios. However, the current default beam configurations for single TRP (sTRP) communications may not be suitable for use for mTRP, especially for multi-DCI (mDCI) scenarios, e.g., during reconfiguration with sync.

Embodiments of the present disclosure provide default beam parameters, including PC parameters, in mTRP scenarios. For example, default beam parameters can be determined for PUSCH or PUCCH transmissions in mTRP systems or for multi-panel simultaneous transmissions.

Figure 4:
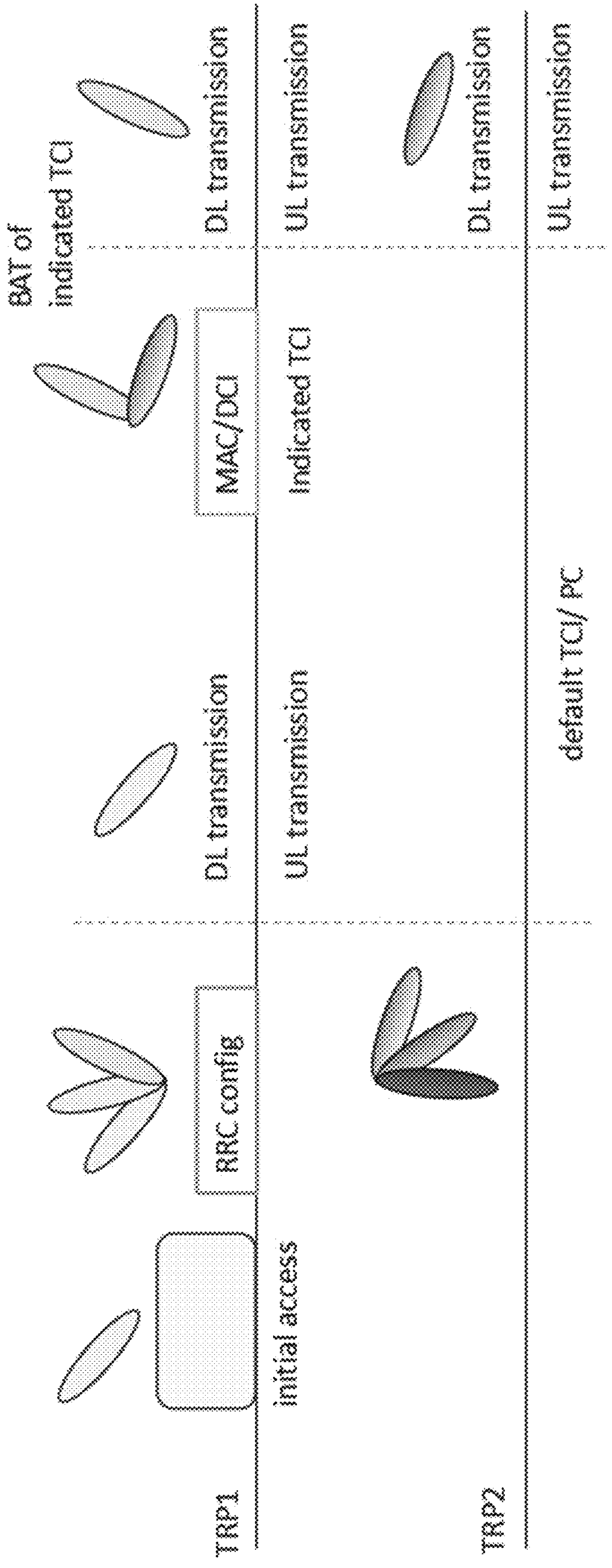
FIG. 4 shows an example multi-transmission and reception point (mTRP) transmission procedure.

FIG. 4 shows an example mTRP transmission procedure. As shown, initial random access is performed using TRP 1. Multiple TCI states are provided via RRC signaling, and a TCI state is indicated for TRP 1 following transmission of MAC/DCI. Note that this is similar to Condition 1 described with regard to Embodiment 1 above.

In the scenario shown in FIG. 4, after initial access is performed using TRP 1, it is difficult to determine a proper TCI state on another TRP, e.g., TRP 2, due to lack of evaluation. In this situation, for TRP 2, the existing beam configurations for sTRP can be used to determine default beam parameters. For TRP 1, default beam parameters can be determined according to the procedures described in the previous embodiments, or the default beam parameters can be determined using existing sTRP configurations.

Figure 5:
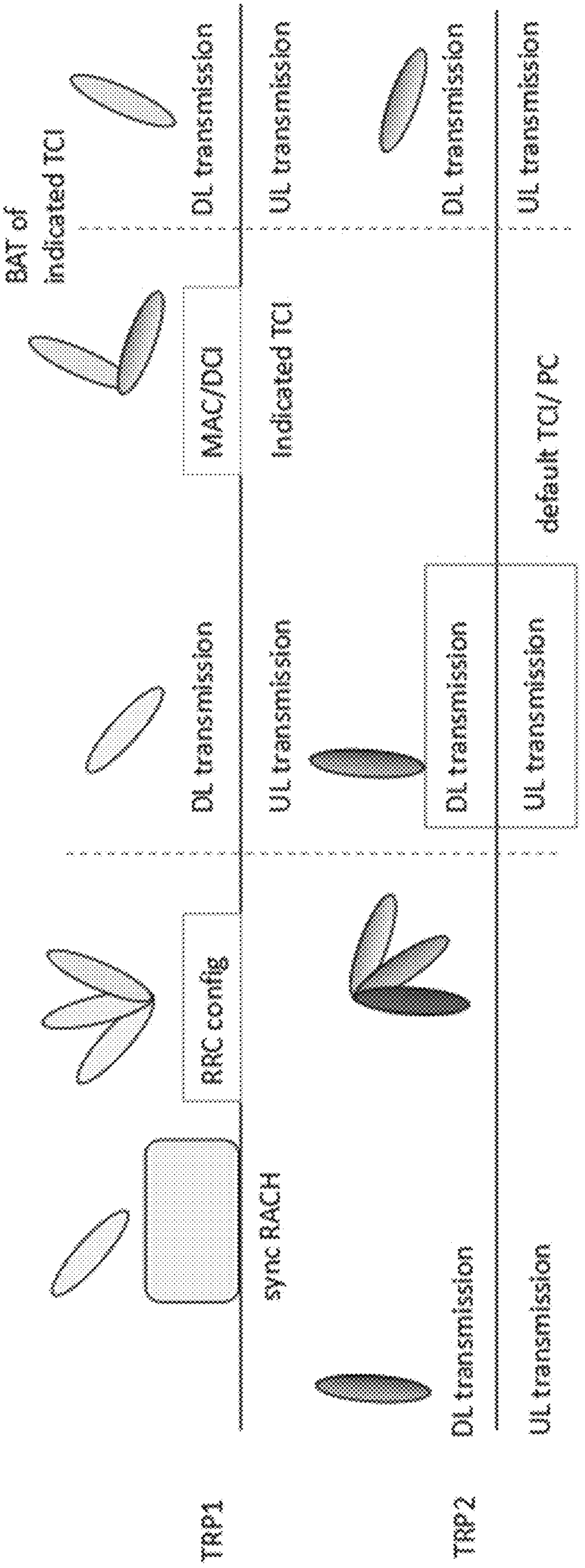
FIG. 5 shows an example mTRP transmission procedure.

FIG. 5 shows an example mTRP transmission procedure. As shown, a random access procedure initiated by a reconfiguration with sync procedure is performed using TRP 1. Multiple TCI states are provided via RRC signaling, and a TCI state is indicated for TRP 1 following transmission of MAC/DCI. Note that this is similar to Condition 2 described with regard to Embodiment 1 above.

In the scenario shown in FIG. 5, with multiple DCIs, TRP 1 and TRP 2 can be configured to operate independently of each other. For example, the reconfiguration with sync procedure associated with TRP 1 in FIG. 5 can be performed without affecting TRP 2, or vice-versa. Thus, each default beam parameters for transmissions can be separately determined for each TRP, depending on whether the transmission is associated with a TRP that itself is associated with a reconfiguration with sync procedure. In FIG. 5, TRP 1 is shown to perform a reconfiguration with sync procedure.

For TRP 1, after a reconfiguration with sync procedure occurs on link related to TRP 1, default beam parameters for downlink transmissions can be determined based on at least one of: a SS/PBCH block (SSB), a CSI-RS (resource), or a TCI state, each corresponding to TRP1. For example, the SS/PBCH block or the CSI-RS resource can be identified by the UE during the random access procedure initiated by the reconfiguration with sync procedure. The SS/PBCH block or the CSI-RS resource can then be used to determine parameters for a subsequent transmission to or reception from TRP1. For example, the determined parameters for transmission or reception may comprise a DM-RS of a PDSCH transmission, a DM-RS of PDCCH transmission, or a CSI-RS applying an indicated TCI state.

In some embodiments, after a UE receives a higher layer configuration of more than one TCI state, e.g., DLorJoint-TCIState, as part of a reconfiguration with sync procedure and before applying an indicated TCI state from the configured TCI states, the UE can determine: a DM-RS of a PDSCH transmission corresponding to TRP 1, a DM-RS of PDCCH transmission corresponding to TRP 1, or that a CSI-RS corresponding to TRP 1 applying an indicated TCI state is quasi co-located with the SS/PBCH block or the CSI-RS resource the UE previously identified during the random access procedure initiated by the reconfiguration with sync procedure.

The following schemes can be used to determine whether PDSCH, PDCCH, and CSI-RS corresponds to a particular TRP:

PDCCH can correspond to the same coresetPoolIndex, or the same TRP information, as a CORESET applied during the random access procedure initiated by the reconfiguration with sync procedure.

PDSCH can correspond to the same coresetPoolIndex, or the same TRP information, as a CORESET applied during the random access procedure initiated by the reconfiguration with sync procedure.

CSI-RS can correspond to the same coresetPoolIndex, or the same TRP information, as a CORESET applied during the random access procedure initiated by the reconfiguration with sync procedure For TRP1, default beam parameters for uplink transmissions can be determined based on at least one of: Msg3, MsgA, or a PUSCH transmission scheduled by a RAR UL grant during the random access procedure initiated by the reconfiguration with sync procedure, each corresponding to TRP1 and following completed sync procedure. These signals can be used to determine parameters for transmission or reception on TRP1. For example, the determined parameters for transmission or reception can include a UL TX spatial filter or power control parameter, where the transmission or reception parameter is applied to a dynamic-grant (DG) or configured-grant (CG) based PUSCH or PUCCH, or to a SRS applying the indicated TCI state.

In some embodiments, transmission parameters are determined after a UE receives a higher layer configuration of more than one TCI state e.g., more than one DLorJoint-TCIState or UL-TCIState, as part of a reconfiguration with sync procedure and before applying an indicated TCI state from the configured TCI states.

For example, the UE can assume that the UL TX spatial filter, if applicable, for dynamic-grant or configured-grant based PUSCH or PUCCH corresponding to TRP1, or for a SRS corresponding to TRP1 applying the indicated TCI state, is the same as a UL TX spatial filter used for a PUSCH transmission scheduled by a RAR UL grant during the random access procedure initiated by the reconfiguration with sync procedure.

In another example, the UE can determine power control parameters, for dynamic-grant and configured-grant based PUSCH or PUCCH corresponding to TRP 1, or for a SRS corresponding to TRP1 applying the indicated TCI state. The UE can determine power control parameters according to the procedures described with reference to Embodiment 1.

The following schemes can be used to determine whether PUSCH, PUCCH, or SRS corresponds to a particular TRP:

A PUCCH can correspond to the same coresetPoolIndex, or the same TRP information, as for a CORESET applied during the random access procedure initiated by the reconfiguration with sync procedure A PUSCH can correspond to the same coresetPoolIndex, or the same TRP information, as for a CORESET applied during the random access procedure initiated by the reconfiguration with sync procedure A SRS can correspond to the same coresetPoolIndex, or the same TRP information, as for a CORESET applied during the random access procedure initiated by the reconfiguration with sync procedure For TRP2, which does not perform a reconfiguration with sync procedure, the indicated TCI (or related PC parameters) for TRP2 are not affected by the random access procedure of TRP1. The default beam parameter schemes described above are thus only applicable for the TRP with RACH with sync procedure, e.g., TRP1.

The above methods can be performed when at least one of the following conditions is satisfied:

- The UE is provided two coresetPoolIndex values 0 and 1 for both a first and a second CORESET;
- The UE is not provided a coresetPoolIndex value for the first CORESETs but is provided a coresetPoolIndex value of 1 for the second CORESETs; or
- The UE is provided sets $\bar{q}_{0,0}$ and $\bar{q}_{1,0}$, or with sets $\bar{q}_{0,1}$ and $\bar{q}_{1,1}$, where a refers to a parameter for beam failure recovery (BFR).

Embodiment 5

Current systems support default beams for beam failure recovery (BFR) with both mDCI and mTRP. In addition, current systems support unified TCI for sTRP BFR scenarios. However, no support is currently provided for unified TCI during BFR with both mDCI and mTRP. Thus techniques are needed to determine default beam parameters, such as PC parameters in such scenarios.

In some embodiments, new beam parameters for BFR, e.g., $q_{new}$, can be applied for the following downlink transmissions: PDCCH, PDSCH, CSI-RS. In addition, $q_{new}$ can be applied to the following uplink transmissions: PUCCH, PUSCH, or SRS. Similar to Embodiment 4 above, each transmission can correspond to a particular TRP in an mTRP system. When BFR occurs for one TRP, then the other TRPs, along with any beam parameters associated with the other TRPs, are not affected. Determining whether a transmission corresponds to a particular TRP can be performed using the methods described above with reference to Embodiment 4.

For example, if BFR happens for one TRP, after BFR is successful, $q_{new}$ for that TRP can be used to determine QCL parameters for a DL transmission for the TRP, such as PDCCH, PDSCH and CSI-RS. In addition, the last PRACH transmission or $q_{new}$ for the TRP can be used to determine a spatial domain filter for a UL transmission associated with the TRP, such as PUCCH, PUSCH, and SRS. Meanwhile, the DL and UL transmissions for other TRP(s) are not affected.

In some embodiments, a UE is provided TCI-State_r17 indicating a unified TCI state for a primary cell (PCell) or a primary and secondary cell (PSCell). After X, e.g., 28, symbols from a last symbol of a first PDCCH reception corresponding to the TRP that is involved in a BFR procedure, in a search space set provided by recoverySearchSpaceId where the UE detects a DCI format with a cyclic redundancy check (CRC) scrambled by a Cell Radio Network Temporary Identifier (C-RNTI) or a Modulation and Coding Scheme (MCS) C-RNTI, the UE can perform the following:

If AdditionaPCIInfo is not provided, the UE monitors PDCCH in all CORESETs related to the TRP or a coresetPoolIndex corresponding to the TRP, and receives a PDCCH or PDSCH transmission related to the TRP or the coresetPoolIndex and an aperiodic CSI-RS in a resource related to the TRP or the coresetPoolIndex from a CSI-RS resource set with the same indicated TCI state as the PDCCH or PDSCH, using the same antenna port quasi co-location parameters as the ones associated with the corresponding index $q_{new}$ related to the TRP, or the coresetPoolIndex obtained from the BFR procedure, if any; or The UE transmits a PUCCH transmission, a PUSCH transmission, or a SRS related to the TRP or the coresetPoolIndex that uses a same spatial domain filter with a same indicated TCI state as the PUCCH or the PUSCH transmissions. The UE can use a same spatial domain filter as a most recent (e.g., the last) PRACH transmission related to the TRP or the coresetPoolIndex.

In some embodiments, a UE is provided TCI-State_r17 indicating a unified TCI state for the PCell or the PSCell. The UE can provide a BFR MAC CE in a Msg3 or MsgA of a contention based random access procedure, where the Msg3 or MsgA are correspond to the TRP that is involved in the BFR procedure, or to a coresetPoolIndex associated with the TRP. After X e.g., 28, symbols from the last symbol of a PDCCH reception that determines the completion of the contention based random access procedure, the UE can perform the following:

IfAdditionaPCIInfo is not provided, the UE monitors PDCCH in all CORESETs related to the TRP or the coresetPoolIndex, and receives a PDSCH transmission related to the TRP or the coresetPoolIndex and an aperiodic CSI-RS resource related to the TRP or the coresetPoolIndex in a CSI-RS resource set with the same indicated TCI state as the PDCCH or PDSCH. The UE can use the same antenna port quasi co-location parameters as those associated with the corresponding index $q_{new}$ related to the TRP or the coresetPoolIndex, if any; or The UE transmits a PUCCH transmission, a PUSCH transmission, or a SRS related to the TRP or the coresetPoolIndex that uses a same spatial domain filter with the same indicated TCI state as for the PUCCH and PUSCH. The UE can use the same spatial domain filter as the last PRACH transmission related to the TRP or the coresetPoolIndex.

In some embodiments, a UE is provided TCI-State_r17 indicating a unified TCI state. The UE can provide, in a first PUSCH MAC CE, index(es) for at least corresponding SCell(s) with radio link quality worse than $Q_{out,LR}$, indication(s) of presence of $q_{new}$ for corresponding SCell(s), and index(es) $q_{neW}$ for a periodic CSI-RS configuration or for a SS/PBCH block provided by higher layers, if any, for corresponding SCell(s). After X e.g., 28, symbols from a last symbol of a PDCCH reception with a DCI format related to a TRP, or a coresetPoolIndex, that schedules a PUSCH transmission with a same hybrid automatic repeat request (HARQ) process number as for a transmission of the first PUSCH and having a toggled new data indicator (NDI) field value, the UE can perform the following:

The UE can monitor PDCCH in all CORESETs related to the TRP or a coresetPoolIndex associated with the TRP, and receive a PDSCH transmission related to the TRP or the coresetPoolIndex and an aperiodic CSI-RS in a resource related to the TRP or the coresetPoolIndex from a CSI-RS resource set using the same antenna port quasi co-location parameters as those associated with a corresponding index $q_{neW}$ related to the TRP or the coresetPoolIndex, if any; or The UE can transmit a PUCCH transmission, a PUSCH transmission, or a SRS related to the TRP or the coresetPoolIndex that uses a same spatial domain filter with the same indicated TCI state as for the PUCCH and PUSCH. The UE can use the same spatial domain filter as those corresponding to $q_{new}$ related to the TRP or the coresetPoolIndex].

For serving cells associated with sets $\overline{q}_{0,0}$ and $\overline{q}_{1,0}$, and with sets $\overline{q}_{0,1}$ and $\overline{q}_{1,1}$, the UE can provide, in a second PUSCH MAC CE: one or more indices for one or more cells with $\overline{q}_{0,0}$ and/or $\overline{q}_{0,1}$ having radio link quality worse than $Q_{out,LR}$; the indices of those $\overline{q}_{0,0}$ and/or $\overline{q}_{0,1}$; or one or more indications of a presence of $\overline{q}_{new}$ and of indices $\overline{q}_{new}$, if any, from corresponding sets $\overline{q}_{1,0}$ and/or $\overline{q}_{1,1}$ for the serving cells.

For serving cells associated with sets $\overline{q}_{0,0}$ and $\overline{q}_{1,0}$, and with sets $\overline{q}_{0,1}$ and $\overline{q}_{1,1}$, and having radio link quality worse than $Q_{out,LR}$, after 28 symbols from a last symbol of a first PDCCH reception with a DCI format scheduling a PUSCH transmission with a same HARQ process number as for a transmission of a second PUSCH and having a toggled NDI field value, the UE assumes that antenna port quasi-colocation parameters satisfy the following:

The antenna port QCL parameters correspond to $q_{new}$ from $\overline{q}_{1,0}$, if any, for the first CORESET; or The antenna port QCL parameters correspond to $q_{new}$ from $\overline{q}_{1,1}$, if any, for the second CORESET.

The subcarrier spacing (SCS) configuration for the 28 symbols is the smallest of the SCS configurations of the active DL BWP for the first PDCCH reception and of the active DL BWP(s) of the serving cells.

The above signaling, including CORESET, PDCCH, PDSCH, CSI-RS, PUCCH, PUSCH, or SRS associated with a TRP can also be understood that such signaling is associated with a resource information indicating at least one of: a transmission and reception point (TRP), a SRS resource set, a spatial relation, power control parameter set, a TCI state, a control resource set (CORESET), a CORESET-PoolIndex, a physical cell index (PCI), an antenna sub-array, a code division multiplexing (CDM) group of demodulation reference signal (DMRS) ports, a group of channel state information reference signal (CSI-RS) resources, a panel entity, or a channel measurement resource (CMR) set.

Embodiment 6

Note that the above methods of Embodiment 5 can be used for mTRP BFR with either mDCI or sDCI.

In the case of sDCI, when one TRP, denoted as TRP1, is performing link recovery, the other TRP, denoted as TRP2, can still operate by dynamic scheduling via DCI. In this case, the sDCI indicate only one TCI corresponding to the operable TRP.) MAC CE can update active TCI codepoints, excluding the recovering TRP, depending on network implementation. Similar to the BFR procedure described in Embodiment 4, the TRPs can operate separately, where the UE is guaranteed a CORESET/SS on the TRP2 link. The MAC CE can provide some codepoints that only reference TCI states for TRP2, and DCI can dynamically schedule on the TRP2 link.

When TRP1 link is recovering, until completely normal, default beam parameters e.g., PRACH or $q_{new}$, should be applied for the TRP1 link. In some embodiments, TRP1 does not schedule PUSCH or PDSCH with TRP2—this can be up to network implementation.

In some embodiments, 2 sets of q0, q1 and source request (SR) for mTRP can also be used for sDCI mTRP. One TRP link recovery should also be supported for sDCI.

Unified TCI to determine default beam parameters can also be configured for sDCI mTRP when there is a reconfiguration with sync procedure on TRP 1, or when BFR is performed on TRP 1. For example, if TRP1 is inoperable, the network can be configured so the other TRP, TRP2, is still operable.

Figure 6:
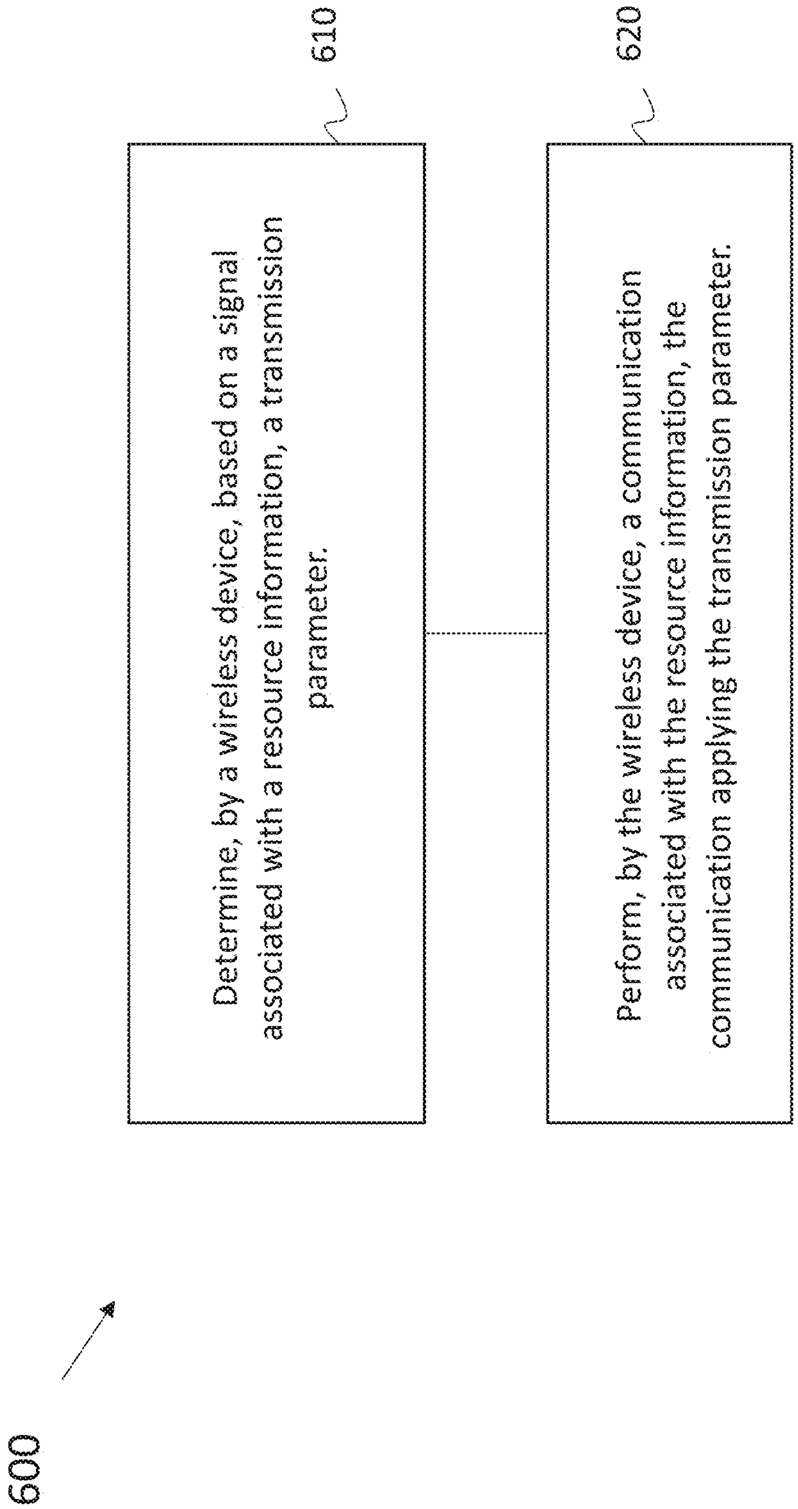
FIG. 6 is a flow diagram of a process for wireless communication in accordance with embodiments of the present disclosure.

FIG. 6 is a flow diagram of a process 600 for wireless communication in accordance with embodiments of the present disclosure. For example, the process 600 can be performed by a wireless device.

At 610, a transmission parameter is determined based on a signal associated with a resource information. For example, the transmission parameter can include a UL TX spatial filter or a PC parameter, and the resource information can indicate at least one of: a transmission and reception point (TRP), a SRS resource set, a spatial relation, power control parameter set, a TCI state, a control resource set (CORESET), a CORESETPoolIndex, a physical cell index (PCI), an antenna sub-array, a code division multiplexing (CDM) group of demodulation reference signal (DMRS) ports, a group of channel state information reference signal (CSI-RS) resources, a panel entity, or a channel measurement resource (CMR) set.

At 620, a communication associated with the resource information is performed, where the communication applies the transmission parameter determined at 610.

In some embodiments, the communication comprises at least one of: a Physical Downlink Control Channel (PDCCH) transmission; a Physical Downlink Shared Channel (PDSCH) transmission; or a channel state information reference signal (CSI-RS), wherein the signal comprises: a SS/PBCH block, a CSI-RS resource identified during the random access procedure, or a new beam RS.

In some embodiments, the communication comprises at least one of: a Physical Uplink Control Channel (PUCCH) transmission; a Physical Uplink Shared Channel (PUSCH) transmission; or a Sounding Reference Signal (SRS), wherein the signal comprises a PUSCH transmission scheduled by a RAR UL grant during random access procedure or a most recent PRACH transmission.

Figure 7:
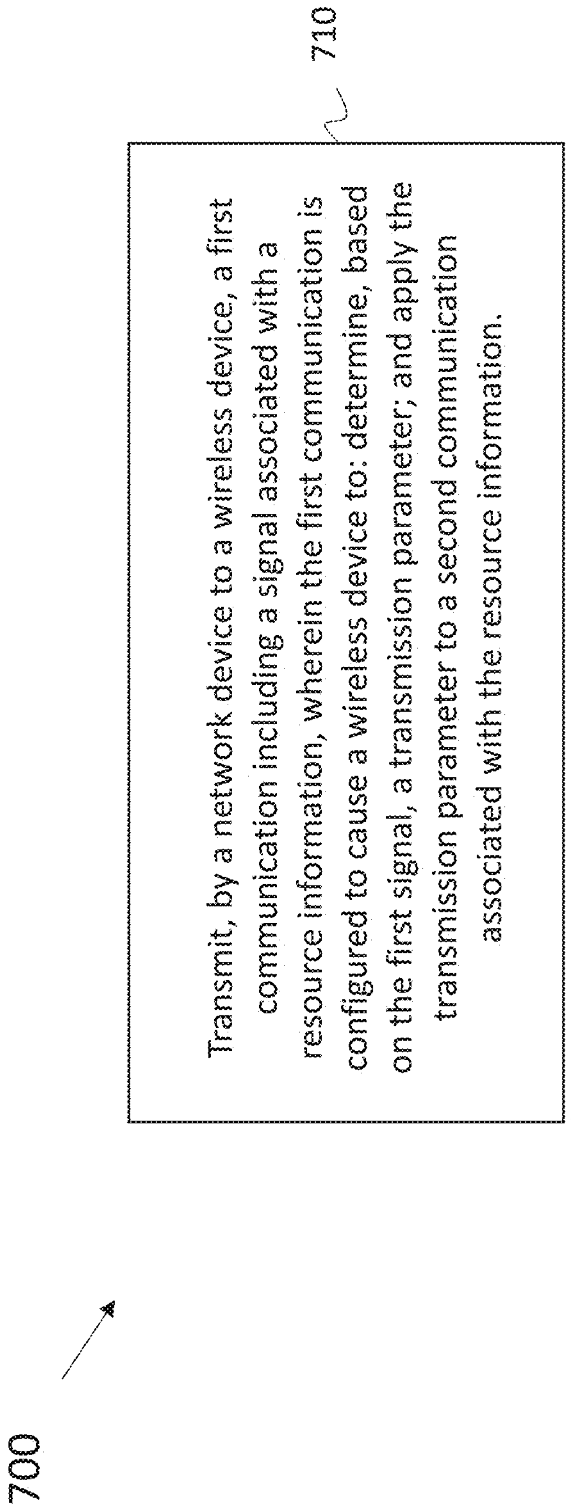
FIG. 7 is a flow diagram of a process for wireless communication in accordance with embodiments of the present disclosure.

FIG. 7 is a flow diagram of a process 700 for wireless communication in accordance with embodiments of the present disclosure. For example, the process 700 can be performed by a network device.

At 710, a first communication including a signal associated with a resource information is transmitted from the network device to a wireless device, where the first communication is configured to cause a wireless device to: determine, based on the signal, a transmission parameter; and apply the transmission parameter to a second communication associated with the resource information. In some embodiments, the network device can perform the second communication with the wireless device.

In some embodiments, the transmission parameter can include a UL TX spatial filter or a PC parameter, and the resource information can indicate at least one of: a transmission and reception point (TRP), a SRS resource set, a spatial relation, power control parameter set, a TCI state, a control resource set (CORESET), a CORESETPoolIndex, a physical cell index (PCI), an antenna sub-array, a code division multiplexing (CDM) group of demodulation reference signal (DMRS) ports, a group of channel state information reference signal (CSI-RS) resources, a panel entity, or a channel measurement resource (CMR) set.

In some embodiments, the second communication comprises at least one of: a Physical Downlink Control Channel (PDCCH) transmission; a Physical Downlink Shared Channel (PDSCH) transmission; or a channel state information reference signal (CSI-RS), wherein the first signal comprises: a SS/PBCH block, a CSI-RS resource identified during the random access procedure, or a new beam RS.

In some embodiments, the second communication comprises at least one of: a Physical Uplink Control Channel (PUCCH) transmission; a Physical Uplink Shared Channel (PUSCH) transmission; or a Sounding Reference Signal (SRS), wherein the first signal comprises a PUSCH transmission scheduled by a RAR UL grant during random access procedure or a most recent PRACH transmission.

Embodiment 7

Example 1

In a first implementation, if CORESET 0 is configured with two TCI states, the UE determines the monitoring occasion of a common search space (CSS) according to an SSB associated with one of the two TCI states, wherein there is mapping relationship between SSBs and monitoring occasions of the CSS.

In a second implementation, if CORESET 0 is configured with two TCI states and the index of the CSS is zero, the UE determines the monitoring occasion of the CSS according to an SSB associated with one of the two TCI states.

In a third implementation, if CORESET 0 is configured with two TCI states, the index of the CSS is zeros, and the two TCI states are associated with different SSB index, the UE determines the monitoring occasion of the CSS according to an SSB associated with one of the two TCI states.

In some implementations, the CSS includes at least one of: a type 0 CSS, a type 0A CSS, or a type 2 CSS.

In some implementations, the monitoring occasion of a CSS is determined according to an SSB associated with the first of the two TCI states.

In some implementations, the monitoring occasion of a CSS is determined according to an SSB associated with a TCI state with a lower TCI state index among the two TCI states.

In some implementations, the monitoring occasion of a CSS is determined according to an SSB associated with the one of the two TCI states, wherein the one TCI state is associated with one PCI (physical cell index) satisfying one feature. For example, the one PCI can be a serving cell PCI which is Cell-specific and is not UE-specific. In some implementations, the one PCI is a serving cell PCI which is configured by Cell-specific signaling and not by UE-specific signaling. In some implementation, the one PCI is a serving cell PCI and is not an additional PCI. If the two TCI states are both associated with the serving cell PCI, then the UE determines the monitoring occasion of CSS according to an SSB associated with the first of the two TCI states, or the TCI state with lower TCI state index among the two TCI states.

In some implementations, the two TCI states are associated with different SSB indexes.

In some implementations, the two TCI states are associated with same SSB indexes.

In some implementations, the two TCI states a associated with a same PCI.

In some implementations, the two TCI states are associated with serving cell PCI.

In some implementations, the two TCI states are associated with serving cell PCI and with same SSB index.

In some implementations, the two TCI states are associated with a serving cell PCI instead of an additional PCI.

In the above implementations, CORESET 0 can be configured with two TCI states. The above methods can also be applied to the case where CORESET 0 is configured with more than two TCI states.

Example 2

If CORESET 0 is configured with two TCI states, the UE can determine the monitoring occasion of a CSS according to an SSB associated with a TCI state with a feature of the two TCI states, where there is mapping relationship between SSBs and monitoring occasions of the CSS. If the number of the TCI state with the feature is two, then the monitoring occasion of CSS is determined according to an SSB associated with each of the two TCI state respectively. In another implementation, if the number of the TCI states with the feature is two and the SSBs of the two TCI states are different, then the monitoring occasion of the CSS is determined according to an SSB associated with each of the two TCI states, respectively.

In some implementations, the one or two TCI states with the feature includes one or two TCI states associated with a serving cell PCI of the two TCI states. For example, if both of the two TCI states are associated with the serving cell PCI, then the monitoring occasions of CSS is determined according to SSBs associated with each of the two TCI states, respectively. If only one of the two TCI states are associated with the serving cell PCI and another is associated with an additional PCI, then the monitoring occasions of CSS is determined according to an SSB associated with the only one of the two TCI states, respectively.

In some implementations, the TCI states with the feature is determined by received signaling. For example, the signaling includes information about which TCI state of the two TCI states is used to determine the monitoring occasion of CSS.

In above implementations, the CORESET 0 can be configured with two TCI states. The above method can also be applied to the case where the CORESET 0 is configured with more than two TCI states.

Example 3

In a type II HARQ-ACK codebook, if the UE indicates support for more than one PDSCH reception on a serving cell that are scheduled from a same PDCCH monitoring occasion and for an active DL BWP of the serving cell, and the UE is not provided coresetPoolIndex, or is provided coresetPoolIndex with value 0 for one or more first CORESETs and is provided coresetPoolIndex with value 1 for one or more second CORESETs, and is provided ackNackFeedbackMode=joint, then the value of the counter downlink assignment indicator (DAI) follows the following order: first, in increasing order of the PDSCH reception starting time for the same {serving cell, PDCCH monitoring occasion} pair and a same coresetPoolIndex; second, in ascending order of coresetPoolIndex for a same {serving cell, PDCCH monitoring occasion} pair; third, in ascending order of serving cell index for a same PDCCH monitoring occasion; and fourth, in ascending order of a PDCCH monitoring occasion index m, where $0 \le m < M$.

The value of the counter downlink assignment indicator (DAI) field in DCI formats denotes the accumulative number of {serving cell, PDCCH monitoring occasion} pair(s) in which PDSCH reception(s), a SPS PDSCH release, or a SCell dormancy indication associated with the DCI formats, excluding the SPS activation DCI, is present, up to the current serving cell and current PDCCH monitoring occasion.

Figure 8:
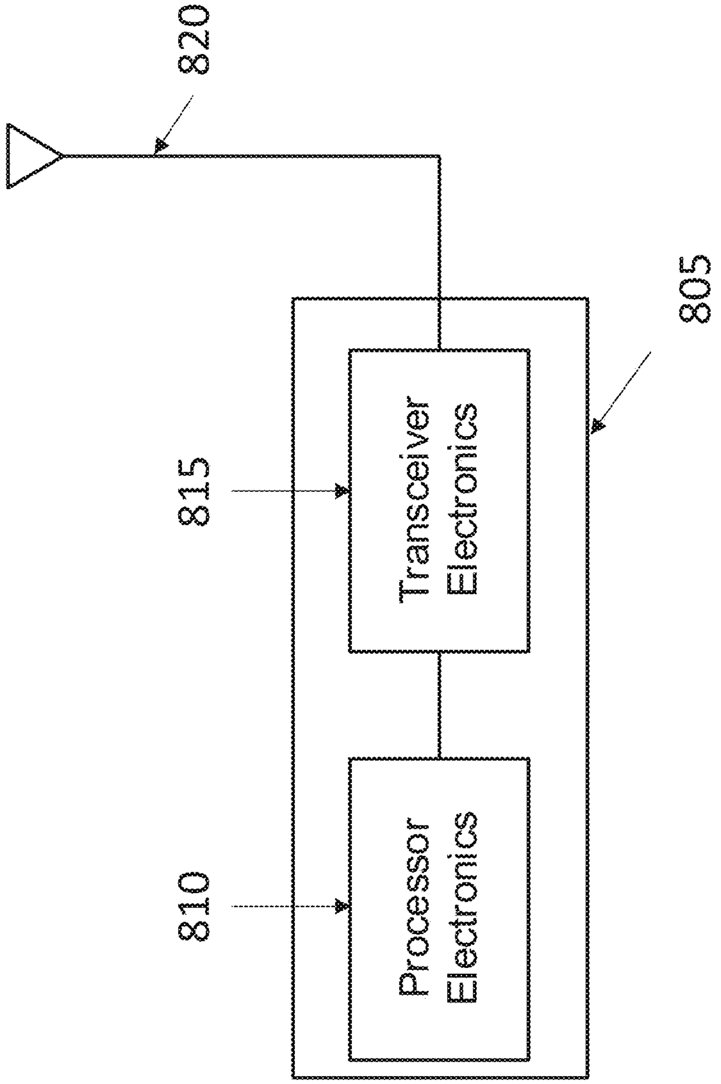
FIG. 8 is a block diagram representation of a portion of an apparatus based on some embodiments of the disclosed technology.

FIG. 8 is a block diagram representation of a portion of an apparatus based on some embodiments of the disclosed technology. An apparatus 805 such as a network device or a base station or a wireless device (or UE), can include processor electronics 810 such as a microprocessor that implements one or more of the techniques presented in this document. The apparatus 805 can include transceiver electronics 815 to send and/or receive wireless signals over one or more communication interfaces such as antenna(s) 820. The apparatus 805 can include other communication interfaces for transmitting and receiving data. Apparatus 805 can include one or more memories (not explicitly shown) configured to store information such as data and/or instructions. In some implementations, the processor electronics 810 can include at least a portion of the transceiver electronics 815. In some embodiments, at least some of the disclosed techniques, modules or functions are implemented using the apparatus 805.

Some embodiments may preferably incorporate the following solutions as described herein.

For example, the solutions listed below may be used by wireless device implementations (e.g., UE 111-113 of FIG. 1) for configuring power control parameters as described herein.

1. A method (e.g., method 200 of FIG. 2) of wireless communication comprising: receiving, by a wireless device, beam state information including a set of beam states (e.g., step 210); determining, by the wireless device, a power control parameter for an uplink transmission (e.g., step 220); and applying, by the wireless device, the power control parameter to the uplink transmission (e.g., step 230).

1a. The method of solution 1, wherein the beam state information is configured based on a RRC signaling.

1b. The method of solution 1 or 1a, wherein the beam state information is activated based on a MAC CE.

2. The method of any of solutions 1-1b, wherein determining the power control parameter is performed: prior to application of an indicated beam state of the set of beam states; or in response to a determination that no power control parameter pool is configured or provided and that an indicated beam state is determined from the set of beam states.

3. The method of any of solutions 1-2, wherein a beam state of the set of beam states comprises at least one of: a reference signal (RS) resource, a RS resource set, or a transmission configuration indicator (TCI) state.

4. The method of any of solutions 1-3, wherein the power control parameter comprises at least one of: a pathloss reference signal (PL-RS), an open loop power control parameter, or a closed loop power control parameter.

5. The method of any of solutions 1-4, wherein the beam state information is received after a random access procedure.

6. The method of solution 5, wherein the random access procedure is an initial random access procedure or a random access procedure initiated by a reconfiguration with sync procedure.
7. The method of any of solutions 1-6, wherein the set of beam states includes only one beam state, and wherein the power control parameter is determined based on the one beam state.
8. The method of any of solutions 1-7, wherein the power control parameter is a pathloss reference signal, and wherein the pathloss reference signal is determined based on at least one of: a Synchronization Signal/Physical Broadcast Channel (SS/PBCH) block with a same SS/PBCH block index as an SS/PBCH block used to obtain a Master Information Block (MIB); a SS/PBCH block associated with a PRACH transmission associated with the random access procedure; a SS/PBCH block identified during an initial random access procedure; a SS/PBCH block identified during a random access procedure initiated by the reconfiguration with sync procedure; a PL-RS associated with at least one of: a Msg3, a MsgA, a PUSCH transmission that occurs after a PRACH transmission, or a Physical Uplink Shared Channel (PUSCH) transmission scheduled by a Random Access Response (RAR) UL grant during a random access procedure; a PL-RS with a lowest ID in a pool of pathloss reference signals; a PL-RS associated with a TCI state with a lowest ID in a joint TCI state pool or an UL TCI state pool; a periodic DL-RS in the indicated TCI state or associated with the indicated TCI state; a lowest control resource set (CORESET) ID; or a lowest CORESET pool ID.
9. The method of any of solutions 1-7, wherein the power control parameter is a target received power (P0), or a pathloss factor (alpha), and wherein the power control parameter is determined based on at least one of: a value of P0 is set to zero; a value of alpha is set to 1; a P0 or an alpha with a lowest ID in a P0 or alpha pool configured for the uplink transmission; a P0 or an alpha configured for the uplink transmission associated with a TCI state with a lowest ID among a joint state pool or a UL TCI state pool; or a P0 or an alpha configured for a Msg3, a MsgA, a PUSCH transmission after a PRACH transmission, or a PUSCH transmission scheduled by a RAR UL grant during a random access procedure.
9b. The method of solution 8 or 9, wherein the random access procedure is an initial access procedure or a random access procedure initiated by a reconfiguration with sync procedure.
10. The method of any of solutions 1-3, wherein the power control parameter is a closed-loop power control parameter, and wherein the closed-loop power control parameter is set to zero.

For example, the solutions listed below may be used by wireless device implementations (e.g., UE 111-113 of FIG. 1) for determining transmission parameters as described herein.

11. A method (e.g., method 600 of FIG. 6) of wireless communication comprising: determining, by a wireless device based on a signal associated with a resource information, a transmission parameter (e.g., step 610 of FIG. 3); and performing, by the wireless device, a communication associated with the resource information, the communication applying the transmission parameter (e.g., step 620).
12. The method of solution 11, wherein the resource information indicates at least one of: a transmission and reception point (TRP), a SRS resource set, a spatial relation, power control parameter set, a TCI state, a control resource set (CORESET), a CORESETPoolIndex, a physical cell index (PCI), an antenna sub-array, a code division multiplexing (CDM) group of demodulation reference signal (DMRS) ports, a group of channel state information reference signal (CSI-RS) resources, a panel entity, or a channel measurement resource (CMR) set.
12b. The method of solution 12, wherein the panel entity comprises at least one of: a UE capability value or set of UE capability values, a panel mode, a antenna group, an antenna port group, a beam group, a beam reporting group, an antenna sub-array, a SRS resource set, a spatial relation, a power control parameter set index, a CORESETPoolIndex, or a PCI.
13. The method of any of solutions 11-12b, wherein the signal is determined during a random access procedure or during a beam failure recovery procedure.
14. The method of solution 13, wherein the random access procedure is initiated by a reconfiguration with sync procedure.
15. The method of any of solutions 11-14, wherein the communication comprises at least one of: a Physical Downlink Control Channel (PDCCH) transmission; a Physical Downlink Shared Channel (PDSCH) transmission; or a channel state information reference signal (CSI-RS), wherein the signal comprises: a SS/PBCH block, a CSI-RS resource identified during the random access procedure, or a new beam RS.
16. The method of any of solutions 11-15, wherein applying the transmission parameter to the communication includes at least one of: determining the communication or a DMRS of the communication is quasi co-located (QCL-ed) with the signal; or an antenna port of the communication is QCL-ed with an antenna port of the signal.
17. The method of any of solutions 11-14, wherein the communication comprises: a Physical Uplink Control Channel (PUCCH) transmission; a Physical Uplink Shared Channel (PUSCH) transmission; or a Sounding Reference Signal (SRS), wherein the signal comprises a PUSCH transmission scheduled by a RAR UL grant during random access procedure or a most recent PRACH transmission.
18. The method of any of solutions 1-14 or 17, wherein applying the transmission parameter to the communication comprises at least one of: applying a UL TX spatial filter associated with the signal to the communication; or applying the UL TX spatial filter associated with the signal to a DMRS of the communication.
19. The method of any of solutions 1-14 or 17, wherein applying the transmission parameter to the communication comprises: applying a power control parameter to the communication, wherein the power control parameter is determined according to the signal, or according to a power control parameter associated with the signal.
20. The method of any of solutions 11-19, wherein the transmission parameter is determined in response to determining that at least one of the following conditions is satisfied: the wireless device is provided a first coresetPoolIndex value of 0 for a first CORESET and a second coresetPoolIndex value of 1 for a second CORESET; the wireless device is not provided the first coresetPoolIndex value for the first CORESET and is provided the second coresetPoolIndex value of 1 for the second CORESET; the wireless device is provided more than one set of RSs for beam failure detection; or the wireless device is provided more than one set of RSs for new beam detection.

For example, the solutions listed below may be used by network device implementations (e.g., BS 120 of FIG. 1) for configuring power control parameters as described herein.

21. A method (e.g., method 300 of FIG. 3) of wireless communication comprising: transmitting, by a network device (e.g., BS 120 of FIG. 1) to a wireless device (e.g., UE 111-113 of FIG. 1), beam state information including a set of beam states, wherein the beam state information is configured to cause the wireless device perform operations including: determining a power control parameter for an uplink transmission; and applying the power control parameter to the uplink transmission.

22. The method of solution 21, wherein determining the power control parameter is performed: prior to application of an indicated beam state of the set of beam states; or in response to a determination that no power control parameter pool is configured or provided and that an indicated beam state is determined from the set of beam states.

23. The method of solution 21 or 22, wherein a beam state of the set of beam states comprises at least one of: a reference signal (RS) resource, a RS resource set, or a transmission configuration indicator (TCI) state.

24. The method of any of solutions 21-23, wherein the power control parameter comprises at least one of: a pathloss reference signal (PL-RS), an open loop power control parameter, or a closed loop power control parameter.

25. The method of any of solutions 21-24, wherein the beam state information is transmitted after a random access procedure.

26. The method of solution 25, wherein the random access procedure is an initial random access procedure or a random access procedure initiated by a reconfiguration with sync procedure.

27. The method of any of solutions 21-26, wherein the set of beam states includes only one beam state, and wherein the power control parameter is determined based on the one beam state.

28. The method of any of solutions 21-27, wherein the power control parameter is a pathloss reference signal, and wherein the pathloss reference signal is determined based on at least one of: a Synchronization Signal/Physical Broadcast Channel (SS/PBCH) block with a same SS/PBCH block index as an SS/PBCH block used to obtain a Master Information Block (MIB); a SS/PBCH block associated with a PRACH transmission associated with the random access procedure; a SS/PBCH block identified during an initial random access procedure; a SS/PBCH block identified during a random access procedure initiated by the reconfiguration with sync procedure; a PL-RS associated with at least one of: a Msg3, a MsgA, a PUSCH transmission that occurs after a PRACH transmission, or a Physical Uplink Shared Channel (PUSCH) transmission scheduled by a Random Access Response (RAR) UL grant during a random access procedure; a PL-RS with a lowest ID in a pool of pathloss reference signals; a PL-RS associated with a TCI state with a lowest ID in a joint TCI state pool or an UL TCI state pool; a periodic DL-RS in the indicated TCI state or associated with the indicated TCI state; a lowest control resource set (CORESET) ID; or a lowest CORESET pool ID.

29. The method of any of solutions 21-27, wherein the power control parameter is a target received power (P0), or a pathloss factor (alpha), and wherein the power control parameter is determined based on at least one of: a value of P0 is set to zero; a value of alpha is set to 1; a P0 or an alpha with a lowest ID in a P0 or alpha pool configured for the uplink transmission; a P0 or an alpha configured for the uplink transmission associated with a TCI state with a lowest ID among a joint state pool or a UL TCI state pool; or a P0 or an alpha configured for a Msg3, a MsgA, a PUSCH transmission after a PRACH transmission, or a PUSCH transmission scheduled by a RAR UL grant during a random access procedure.

29b. The method of solution 28 or 29, wherein the random access procedure is an initial access procedure or a random access procedure initiated by a reconfiguration with sync procedure.

30. The method of any of solutions 21-23, wherein the power control parameter is a closed-loop power control parameter, and wherein the closed-loop power control parameter is set to zero.

For example, the solutions listed below may be used by network device implementations (e.g., BS 120 of FIG. 1) for determining transmission parameters as described herein.

31. A method (e.g., method 700 of FIG. 7) of wireless communication comprising: performing, by a network device (e.g., BS 120 of FIG. 1), a first communication including a signal associated with a resource information, wherein the first communication is configured to cause a wireless device (e.g., UE 111-113 of FIG. 1) to perform operations including: determining, based on the first signal, a transmission parameter; and applying the transmission parameter to a second communication associated with the resource information (e.g., 710).

32. The method of solution 31, wherein the resource information indicates at least one of: a transmission and reception point (TRP), a SRS resource set, a spatial relation, power control parameter set, a TCI state, a control resource set (CORESET), a CORESETPoolIndex, a physical cell index (PCI), an antenna sub-array, a code division multiplexing (CDM) group of demodulation reference signal (DMRS) ports, a group of channel state information reference signal (CSI-RS) resources, a panel entity, or a channel measurement resource (CMR) set.

32b. The method of solution 32, wherein the panel entity comprises at least one of: a UE capability value or set of UE capability values, a panel mode, a antenna group, an antenna port group, a beam group, a beam reporting group, an antenna sub-array, a SRS resource set, a spatial relation, a power control parameter set index, a CORESETPoolIndex, or a PCI.

33. The method of any of solutions 31-32b, wherein the signal is determined during a random access procedure or during a beam failure recovery procedure.

34. The method of solution 33, wherein the random access procedure is initiated by a reconfiguration with sync procedure.

35. The method of any of solutions 31-34, wherein the second communication comprises at least one of: a Physical Downlink Control Channel (PDCCH) transmission; a Physical Downlink Shared Channel (PDSCH) transmission; or a channel state information reference signal (CSI-RS), wherein the signal comprises: a SS/PBCH block, a CSI-RS resource identified during the random access procedure, or a new beam RS.

36. The method of any of solutions 31-35, wherein applying the transmission parameter to the second communication includes at least one of: determining the second communication or a DMRS of the second communication is quasi co-located (QCL-ed) with the signal; or an antenna port of the second communication is QCL-ed with an antenna port of the signal.

37. The method of any of solutions 31-34, wherein the second communication comprises: a Physical Uplink Control Channel (PUCCH) transmission; a Physical Uplink Shared Channel (PUSCH) transmission; or a Sounding Reference Signal (SRS), wherein the signal comprises a PUSCH transmission scheduled by a RAR UL grant during random access procedure or a most recent PRACH transmission.

38. The method of any of solutions 31-34 or 37, wherein applying the transmission parameter to the second communication comprises at least one of: applying a UL TX spatial filter associated with the signal to the second communication; or applying the UL TX spatial filter associated with the signal to a DMRS of the second communication.

39. The method of any of solutions 31-34 or 37, wherein applying the transmission parameter to the second communication comprises: applying a power control parameter to the second communication, wherein the power control parameter is determined according to the signal, or according to a power control parameter associated with the signal.

40. The method of any of solutions 31-39, wherein the transmission parameter is determined in response to determining that at least one of the following conditions is satisfied: the wireless device is provided a first coresetPoolIndex value of 0 for a first CORESET and a second coresetPoolIndex value of 1 for a second CORESET; the wireless device is not provided the first coresetPoolIndex value for the first CORESET and is provided the second coresetPoolIndex value of 1 for the second CORESET; the wireless device is provided more than one set of RSs for beam failure detection; or the wireless device is provided more than one set of RSs for new beam detection.

41. An apparatus (e.g., apparatus 805 of FIG. 8) for wireless communication comprising a processor configured to implement the method of any of solutions 1 to 40.

42. A computer readable medium having code stored thereon, the code when executed by a processor, causing the processor to implement a method recited in any of solutions 1 to 40.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication comprising:

receiving, by a wireless device, beam state information including a set of beam states in a Radio Resource Control (RRC) signaling, wherein the beam state information is received after a random access procedure, and wherein the random access procedure is an initial random access procedure or a random access procedure initiated by a reconfiguration with sync procedure;

determining, by the wireless device prior to application of an indicated beam state of the set of beam states, a power control parameter for an uplink transmission, wherein the indicated beam state is indicated by a Medium Access Control (MAC) Control Element (MAC CE) or a Downlink Control Information (DCI) signaling, wherein the power control parameter comprises a pathloss reference signal, a target received power (P0), a pathloss factor (alpha), or a closed-loop power control parameter; and applying, by the wireless device, the power control parameter to the uplink transmission.

2. The method of claim 1, wherein a beam state of the set of beam states comprises at least one of: a reference signal (RS) resource, a RS resource set, or a transmission configuration indicator (TCI) state, and wherein the power control parameter comprises at least one of: a pathloss reference signal (PL-RS), an open loop power control parameter, or a closed loop power control parameter.

3. The method of claim 1, wherein the power control parameter is the pathloss reference signal, and wherein the pathloss reference signal is determined based on at least one of:

a Synchronization Signal/Physical Broadcast Channel (SS/PBCH) block with a same SS/PBCH block index as an SS/PBCH block used to obtain a Master Information Block (MIB);

a SS/PBCH block associated with a PRACH transmission associated with the random access procedure;

a SS/PBCH block identified during an initial random access procedure;

a SS/PBCH block identified during a random access procedure initiated by the reconfiguration with sync procedure;

a PL-RS associated with at least one of: a Msg3, a MsgA, a PUSCH transmission that occurs after a PRACH transmission, or a Physical Uplink Shared Channel (PUSCH) transmission scheduled by a Random Access Response (RAR) UL grant during a random access procedure;

a PL-RS with a lowest ID in a pool of pathloss reference signals;

a PL-RS associated with a TCI state with a lowest ID in a joint TCI state pool or an UL TCI state pool;

a periodic DL-RS in an indicated TCI state or associated with the indicated TCI state;

a lowest control resource set (CORESET) ID; or a lowest CORESET pool ID.

4. The method of claim 1, wherein the power control parameter is the target received power (P0) or the pathloss factor (alpha), and wherein the power control parameter is determined based on at least one of:

a value of P0 is set to zero;

a value of alpha is set to 1;

a P0 or an alpha with a lowest ID in a P0 or alpha pool configured for the uplink transmission;

a P0 or an alpha configured for the uplink transmission associated with a TCI state with a lowest ID among a joint state pool or a UL TCI state pool; or a P0 or an alpha configured for a Msg3, a MsgA, a PUSCH transmission after a PRACH transmission, or a PUSCH transmission scheduled by a RAR UL grant during a random access procedure.

5. The method of claim 1, wherein the power control parameter is the closed-loop power control parameter, and wherein the closed-loop power control parameter is set to zero.

6. A method of wireless communication comprising:

transmitting, by a network device to a wireless device, beam state information including a set of beam states in a Radio Resource Control (RRC) signaling, wherein the beam state information is received after a random access procedure, and wherein the random access procedure is an initial random access procedure or a random access procedure initiated by a reconfiguration with sync procedure, wherein the beam state information is configured to cause the wireless device to perform operations including:

determining a power control parameter for an uplink transmission prior to application of an indicated beam state of the set of beam states, wherein the network device indicates the indicated beam state by a Medium Access Control (MAC) Control Element (MAC CE) or a Downlink Control Information (DCI) signaling, wherein the power control parameter comprises a pathloss reference signal, a target received power (P0), a pathloss factor (alpha), or a closed-loop power control parameter; and applying the power control parameter to the uplink transmission.

7. The method of claim 6, wherein a beam state of the set of beam states comprises at least one of: a reference signal (RS) resource, a RS resource set, or a transmission configuration indicator (TCI) state, and wherein the power control parameter comprises at least one of: a pathloss reference signal (PL-RS), an open loop power control parameter, or a closed loop power control parameter.

8. The method of claim 6, wherein the power control parameter is the pathloss reference signal, and wherein the pathloss reference signal is determined based on at least one of:

a Synchronization Signal/Physical Broadcast Channel (SS/PBCH) block with a same SS/PBCH block index as an SS/PBCH block used to obtain a Master Information Block (MIB);

a SS/PBCH block associated with a PRACH transmission associated with the random access procedure;

a SS/PBCH block identified during an initial random access procedure;

a SS/PBCH block identified during a random access procedure initiated by a reconfiguration with sync procedure;

a PL-RS associated with at least one of: a Msg3, a MsgA, a PUSCH transmission that occurs after a PRACH transmission, or a Physical Uplink Shared Channel (PUSCH) transmission scheduled by a Random Access Response (RAR) UL grant during a random access procedure;

a PL-RS with a lowest ID in a pool of pathloss reference signals;

a PL-RS associated with a TCI state with a lowest ID in a joint TCI state pool or an UL TCI state pool;

a periodic DL-RS in an indicated TCI state or associated with the indicated TCI state;

a lowest control resource set (CORESET) ID; or a lowest CORESET pool ID.

9. The method of claim 6, wherein the power control parameter is the target received power (P0) or the pathloss factor (alpha), and wherein the power control parameter is determined based on at least one of:

a value of P0 is set to zero;

a value of alpha is set to 1;

a P0 or an alpha with a lowest ID in a P0 or alpha pool configured for the uplink transmission;

a P0 or an alpha configured for the uplink transmission associated with a TCI state with a lowest ID among a joint state pool or a UL TCI state pool; or a P0 or an alpha configured for a Msg3, a MsgA, a PUSCH transmission after a PRACH transmission, or a PUSCH transmission scheduled by a RAR UL grant during a random access procedure.

10. The method of claim 6, wherein the power control parameter is the closed-loop power control parameter, and wherein the closed-loop power control parameter is set to zero.

11. An apparatus for wireless communication comprising processor electronics and a memory storing instructions, execution of which by the processor electronics causes the apparatus to:

receive beam state information including a set of beam states in a Radio Resource Control (RRC) signaling, wherein the beam state information is received after a random access procedure, and wherein the random access procedure is an initial random access procedure or a random access procedure initiated by a reconfiguration with sync procedure;

determine a power control parameter for an uplink transmission prior to application of an indicated beam state of the set of beam states, wherein the indicated beam state is indicated by a Medium Access Control (MAC) Control Element (MAC CE) or a Downlink Control Information (DCI) signaling, wherein the power control parameter comprises a pathloss reference signal, a target received power (P0), or a pathloss factor (alpha), or a closed-loop power control parameter; and apply the power control parameter to the uplink transmission.

12. The apparatus of claim 11, wherein a beam state of the set of beam states comprises at least one of: a reference signal (RS) resource, a RS resource set, or a transmission configuration indicator (TCI) state, and wherein the power control parameter comprises at least one of: a pathloss reference signal (PL-RS), an open loop power control parameter, or a closed loop power control parameter.

13. The apparatus of claim 11, wherein the power control parameter is the pathloss reference signal, and wherein the pathloss reference signal is determined based on at least one of:

a Synchronization Signal/Physical Broadcast Channel (SS/PBCH) block with a same SS/PBCH block index as an SS/PBCH block used to obtain a Master Information Block (MIB);

a SS/PBCH block associated with a PRACH transmission associated with the random access procedure;

a SS/PBCH block identified during an initial random access procedure;

a SS/PBCH block identified during a random access procedure initiated by the reconfiguration with sync procedure;

a PL-RS associated with at least one of: a Msg3, a MsgA, a PUSCH transmission that occurs after a PRACH transmission, or a Physical Uplink Shared Channel (PUSCH) transmission scheduled by a Random Access Response (RAR) UL grant during a random access procedure;

a PL-RS with a lowest ID in a pool of pathloss reference signals;

a PL-RS associated with a TCI state with a lowest ID in a joint TCI state pool or an UL TCI state pool;

a periodic DL-RS in an indicated TCI state or associated with the indicated TCI state;

a lowest control resource set (CORESET) ID; or a lowest CORESET pool ID.

14. The apparatus of claim 11, wherein the power control parameter is the target received power (P0) or the pathloss factor (alpha), and wherein the power control parameter is determined based on at least one of:

a value of P0 is set to zero;

a value of alpha is set to 1;

a P0 or an alpha with a lowest ID in a P0 or alpha pool configured for the uplink transmission;

a P0 or an alpha configured for the uplink transmission associated with a TCI state with a lowest ID among a joint state pool or a UL TCI state pool; or a P0 or an alpha configured for a Msg3, a MsgA, a PUSCH transmission after a PRACH transmission, or a PUSCH transmission scheduled by a RAR UL grant during a random access procedure.

15. The apparatus of claim 11, wherein the power control parameter is the closed-loop power control parameter, and wherein the closed-loop power control parameter is set to zero.

16. An apparatus for wireless communication comprising processor electronics and a memory storing instructions, execution of which by the processor electronics causes the apparatus to:

transmit, to a wireless device, beam state information including a set of beam states in a Radio Resource Control (RRC) signaling, wherein the beam state information is received after a random access procedure, and wherein the random access procedure is an initial random access procedure or a random access procedure initiated by a reconfiguration with sync procedure, wherein the beam state information is configured to cause the wireless device perform operations including:

determining a power control parameter for an uplink transmission prior to application of an indicated beam state of the set of beam states, wherein the network device indicates the indicated beam state by a Medium Access Control (MAC) Control Element (MAC CE) or a Downlink Control Information (DCI) signaling, wherein the power control parameter comprises a pathloss reference signal, a target received power (P0), a pathloss factor (alpha), or a closed-loop power control parameter; and applying the power control parameter to the uplink transmission.

17. The apparatus of claim 16, wherein a beam state of the set of beam states comprises at least one of: a reference signal (RS) resource, a RS resource set, or a transmission configuration indicator (TCI) state, and wherein the power control parameter comprises at least one of: a pathloss reference signal (PL-RS), an open loop power control parameter, or a closed loop power control parameter.

18. The apparatus of claim 16, wherein the power control parameter is the pathloss reference signal, and wherein the pathloss reference signal is determined based on at least one of:

a Synchronization Signal/Physical Broadcast Channel (SS/PBCH) block with a same SS/PBCH block index as an SS/PBCH block used to obtain a Master Information Block (MIB);

a SS/PBCH block associated with a PRACH transmission associated with the random access procedure;

a SS/PBCH block identified during an initial random access procedure;

a SS/PBCH block identified during a random access procedure initiated by a reconfiguration with sync procedure;

a PL-RS associated with at least one of: a Msg3, a MsgA, a PUSCH transmission that occurs after a PRACH transmission, or a Physical Uplink Shared Channel (PUSCH) transmission scheduled by a Random Access Response (RAR) UL grant during a random access procedure;

a PL-RS with a lowest ID in a pool of pathloss reference signals;

a PL-RS associated with a TCI state with a lowest ID in a joint TCI state pool or an UL TCI state pool;

a periodic DL-RS in an indicated TCI state or associated with the indicated TCI state;

a lowest control resource set (CORESET) ID; or a lowest CORESET pool ID.

19. The apparatus of claim 16, wherein the power control parameter is the target received power (P0) or the pathloss factor (alpha), and wherein the power control parameter is determined based on at least one of:

a value of P0 is set to zero;

a value of alpha is set to 1;

a P0 or an alpha with a lowest ID in a P0 or alpha pool configured for the uplink transmission;

a P0 or an alpha configured for the uplink transmission associated with a TCI state with a lowest ID among a joint state pool or a UL TCI state pool; or a P0 or an alpha configured for a Msg3, a MsgA, a PUSCH transmission after a PRACH transmission, or a PUSCH transmission scheduled by a RAR UL grant during a random access procedure.

20. The apparatus of claim 16, wherein the power control parameter is the closed-loop power control parameter, and wherein the closed-loop power control parameter is set to zero.

* * * * *